(12) United States Patent
Becker

(10) Patent No.: US 9,133,739 B2
(45) Date of Patent: Sep. 15, 2015

(54) METHOD FOR IN-SITU FORMING OF LOW FRICTION COATINGS ON ENGINE CYLINDER BORES

(71) Applicant: GM Global Technology Operations LLC, Detroit, MI (US)

(72) Inventor: Edward P. Becker, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 129 days.

(21) Appl. No.: 13/893,919

(22) Filed: May 14, 2013

(65) Prior Publication Data

US 2013/0319365 A1    Dec. 5, 2013

Related U.S. Application Data

(60) Provisional application No. 61/653,034, filed on May 30, 2012.

(51) Int. Cl.
  *F01M 9/02* (2006.01)
  *F02F 1/20* (2006.01)
  *F16J 10/04* (2006.01)
  *C10M 125/22* (2006.01)

(52) U.S. Cl.
  CPC .............. *F01M 9/02* (2013.01); *C10M 125/22* (2013.01); *F02F 1/20* (2013.01); *F16J 10/04* (2013.01); *C10M 2201/065* (2013.01); *C10M 2201/066* (2013.01); *C10N 2210/06* (2013.01); *C10N 2230/06* (2013.01); *C10N 2240/10* (2013.01); *C10N 2250/121* (2013.01)

(58) Field of Classification Search
  CPC .......... F01M 9/02; C23C 18/00; C23C 26/00; B05D 7/22; F02F 1/20; F16J 10/04; C10M 125/22; C10M 2201/065; C10M 2201/066; C10N 2210/06; C10N 2230/06; C10N 2240/10; C10N 2250/121
  USPC ............ 123/196 M, 1 A, 196 R; 427/11, 230; 184/6.8
  See application file for complete search history.

(56) References Cited

U.S. PATENT DOCUMENTS

| RE34,143 | E  | * | 12/1992 | Rao et al. .................... 123/193.4 |
| 5,313,919 | A  | * | 5/1994  | Rao et al. .................... 123/193.4 |
| 5,315,970 | A  | * | 5/1994  | Rao et al. .................... 123/193.2 |
| 6,515,254 | B2 | * | 2/2003  | Beck et al. .............. 219/121.69 |
| 7,022,419 | B2 | * | 4/2006  | Ishigami et al. .............. 428/635 |
| 7,357,068 | B2 | * | 4/2008  | Barbezat ..................... 92/170.1 |

(Continued)

FOREIGN PATENT DOCUMENTS

CN    101178124 A    5/2008

*Primary Examiner* — Lindsay Low
*Assistant Examiner* — Grant Moubry
(74) *Attorney, Agent, or Firm* — Dinsmore & Shohl LLP

(57) ABSTRACT

A low friction coating for an internal combustion engine and a method of forming a low friction surface on at least one of the engine's friction-sensitive components. In one form, a solid lubricant precursor additive is combined with motor oil such that upon work being performed on the combination by adjacently-interacting engine components, the solid lubricant tribochemically reacts to form a friction-reducing coating or film. In one preferred form, the coating or film is triboformed on a cylinder bore or a liner configured to fit within the bore. The reciprocating movement between the cylinder or liner and a piston and/or piston rings promotes in-situ formation of the layer after the engine has already been manufactured rather than during engine fabrication or assembly.

15 Claims, 2 Drawing Sheets

(56) References Cited

U.S. PATENT DOCUMENTS

| | | | |
|---|---|---|---|
| 7,412,955 B2* | 8/2008 | Kurita et al. | 123/188.11 |
| 7,765,977 B2* | 8/2010 | Kurita et al. | 123/195 R |
| 7,998,572 B2* | 8/2011 | McGilvray et al. | 428/323 |
| 8,545,930 B2* | 10/2013 | Stavlid | 427/11 |
| 2010/0008808 A1* | 1/2010 | Yoshimi et al. | 418/63 |
| 2010/0229822 A1* | 9/2010 | Kurita et al. | 123/195 R |
| 2010/0272931 A1 | 10/2010 | Stavlid | |

* cited by examiner

METHOD FOR IN-SITU FORMING OF LOW FRICTION COATINGS ON ENGINE CYLINDER BORES

This application claims priority to U.S. Provisional Application 61/653,034, filed May 30, 2012.

BACKGROUND OF THE INVENTION

The present invention relates generally to reducing friction forces between components in an internal combustion engine, and more particularly to using a solid lubricant as an additive to an engine oil to form a low friction surface between the cylinder wall or bore and one or more of the piston and piston rings.

The cylinder walls and cylinder liners of an internal combustion engine (ICE) are manufactured to exacting standards with close surface roughness tolerances as a way to keep friction wear to a minimum. Liquid lubricants such as engine oil (also referred to herein as motor oil) are used to further reduce friction, as well as a way to transfer heat generated in the cylinder during engine operation. Typically, the lubricant occupies the space provided by the residual roughness in the cylinder or liner walls to help provide a film-like layer between the cylinder and the reciprocating piston and piston ring assembly. Nevertheless, liquid lubricants have certain limitations. For example, in situations where friction-reducing additives are used, the low solubility of such additives in conventional lubricant base fluids reduces the benefit of such additives.

Other forms of lubricants, such as solid lubricants applied to or otherwise formed on one or more of the interacting component surfaces, may be used to further improve wear-reduction properties. US Published Patent Application 2010/0272931—which is incorporated by reference in its entirety—discloses a method of tribochemically depositing (i.e., by friction stimulating) a solid lubricant substance directly onto the rough curved surface of an engine cylinder wall or liner wall using an oxide, carbide or silicide tool with motion in at least two transverse directions such that a stable sulfide is formed to improve the friction properties of the wall, particularly in the mixed and boundary lubrication regimes, where actual contact between the moving surfaces is most likely to occur. Examples of such solid lubricants may include graphite, molybdenum disulfide ($MoS_2$) and tungsten disulfide ($WS_2$), all of which exhibit desirable friction properties. It is generally perceived that tribochemical approaches have the ability to produce very smooth, defect-free surfaces.

Nevertheless, it is difficult and expensive to provide solid lubricant surface treatment for complex component shapes. This is especially true for cylinder walls, where limited spaces coupled with inherent non-planarity make it difficult to achieve with thermal decomposition, physical vapor deposition (PVD), chemical vapor deposition (CVD) electroplating, spraying or related known solid lubricant deposition techniques. In addition, the metallic makeup of the part being coated may exacerbate the solid lubricant deposition problem.

SUMMARY OF THE PRESENT INVENTION

It is against the above background that one embodiment of the present invention relates to the use of a solid lubricant precursor as an engine oil additive as a way to improve the tribological properties of the resulting compound. More particularly, the additive tribochemically reacts with the engine oil and the components to be protected during the early phases of engine operation (often known as the "run-in" or "break-in" period) to form a friction-reducing coating. In one form, the present invention includes forming a durable tribofilm on the cylinder or liner bores; this tribofilm is especially valuable during early engine run-in as a way to extend the life of wear-susceptible components, such as the cylinder or liner. Whereas the previous use of chemicals such as those described in the aforementioned US Patent Application 2010/0272931 is to form the tribolayer during manufacturing of the cylinder or liner, the present invention involves the in-situ formation of the layer in an already-manufactured engine.

According to a first embodiment of the present invention, a method of in-situ forming a low friction coating on a cylinder wall of an ICE is disclosed. In the present context, in-situ forming differs from that of forming by manufacturing or other pre-operational approaches in that the formation of the protective friction-reducing surface takes place upon normal operation of the engine, rather than during some machining or related manufacturing process. Such normal operation corresponds to the starting and subsequent running of the engine for its normal purpose; thus, in vehicular situations, such normal operation would include running the engine to provide propulsive, heat, cooling or related power to the vehicle. Likewise, in non-vehicular applications, such normal operation would include starting and running the engine in order for it to perform work for which the engine was designed. Contrarily, approaches that would not be considered to be in-situ within the present context would be those where the film or coating is formed during a machining or other manufacturing step where operation of the engine for its intended purpose is not possible.

The method includes providing a lubricant to at least a region within the engine that corresponds to the cylinder wall, liner wall or other such surface configured to slidably engage a reciprocating piston. The method also includes introducing a solid lubricant additive to the region, then traversing the piston along a path defined by the cylinder wall. In this way, a thin film of additive-bearing lubricant is formed between the slidingly cooperative surfaces of the piston and cylinder wall. This in turn causes a tribochemical interaction to take place between at least some of the solid lubricant additive and one or both of the cylinder wall and the piston; this in turn forms a protective layer on the respective surfaces of the cylinder wall, piston and ancillary cylinder or piston components (such as rings or the like).

In accordance with another embodiment of the present invention, operating an internal combustion engine is disclosed. The method includes moving one or more pistons in a corresponding number of cylinder walls. The cooperation of the piston and its corresponding cylinder is such that movement of the piston is substantially limited along a reciprocating direction within a region defined by the cylinder wall. A lubricant is introduced into the region prior to starting or otherwise operating the engine in its normal manner. The method also includes introducing a solid lubricant additive to the region—either in conjunction with or separately from—the lubricant such that upon subsequent reciprocation of the piston within the cylinder wall, a tribochemical interaction between a portion of the solid lubricant additive that is situated between the slidingly cooperative cylinder wall and the piston forms a protective layer on at least one of the cylinder wall, the piston or ancillary components thereof.

In accordance with another embodiment of the present invention, a method of tribochemically forming a low friction surface on an internal combustion engine is disclosed. The method includes introducing a liquid lubricant and a solid lubricant additive to a surface of one or more of a first engine component and a second engine component. The method further includes operating the engine through an internal combustion process to have the first and second components move relative to one another such that a tribochemical interaction involving at least one of the lubricant and additive takes place on the surface of one or both of the components such that a protective tribofilm is formed thereon. In the present context, the operation of the engine through an internal combustion process is that which is encountered during normal engine use, such as propelling a vehicle to which the engine is coupled. Thus, the generation of an explosion within the engine by introducing a fuel, air source and spark into a combustion chamber formed within a cylinder in an engine block would force a piston located within the cylinder to move away from the explosion, thereby imparting motive force to a crankshaft or related component. Such operation is considered to be consistent with the present understanding of in-situ formation of the protective coating or film.

In accordance with another embodiment of the present invention, a motor oil configured to deposit a protective tribofilm on a friction-sensitive engine component upon normal operation of the engine is disclosed. The motor oil (which may be based on a conventional petroleum primary liquid, or based on a synthetic composition) includes solid lubricant additives such as the aforementioned $MoS_2$ or $WS_2$ that—upon rubbing, sliding contact or related frictional contact between adjacent engine components due to normal engine operating conditions—forms a friction-reducing surface coating within the roughness of the surfaces of one or both components.

BRIEF DESCRIPTION OF THE DRAWINGS

The following detailed description of specific embodiments can be best understood when read in conjunction with the following drawings, where like structure is indicated with like reference numerals and in which.

Figure 1:
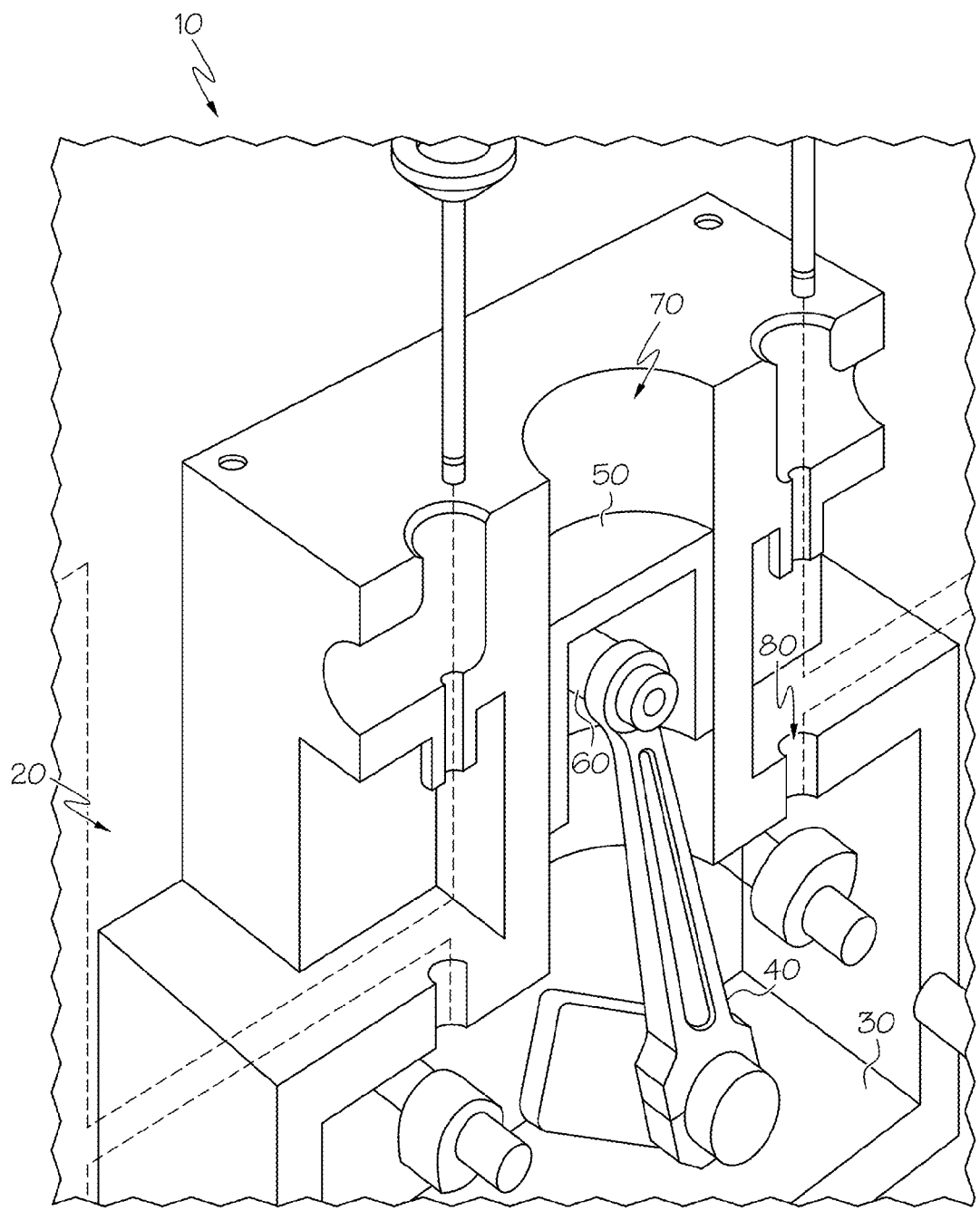
FIG. 1 shows a cutaway view of the reciprocating cooperation between a cylinder and a piston in an internal combustion engine.

The embodiments set forth in the drawings are illustrative in nature and are not intended to be limiting. Moreover, individual aspects of the drawings and the embodiments depicted therein will be more fully apparent and understood in view of the detailed description that follows.

DETAILED DESCRIPTION OF THE PREFERRED EMBODIMENTS

Referring initially to FIG. 1, a cutaway view of a portion of a simplified automotive engine 10 with a block 20, crankshaft 30, connecting rod 40, piston 50 piston pin 60 and cylinder 70 (also referred to herein as cylinder wall, cylinder bore or the like) that is formed in block 20 is shown. The cooperation of (among other components), connecting rod 40 and piston pin 60 converts the rotational movement of the crankshaft 30 into reciprocating movement of the piston 50 within the walls of the cylinder 70. As will be appreciated by those skilled in the art, the cylinder 70 may also include a separate removable liner or sleeve (not shown) that can act as a surrogate for the cylinder wall; either version is deemed to be within the scope of the present invention. As such, reference to the formation of the low friction coating onto cylinder 70 will be understood to apply equally to a cylinder liner or sleeve as well, depending on which surface interacts with the piston 50.

A lubricant (such as a motor oil, not shown) may be circulated throughout various parts of engine 10, including those that correspond to the piston 50 and cylinder 70. Such motor oil may be of conventional (i.e., petroleum-based) or synthetic origin. Lubrication paths 80 are networked throughout the block 20 (as well as other parts of engine 10) and cooperate with a pump or related pressurizing device (not shown) to facilitate the delivery of the lubricant to the region defined within the cylinder 70. An important part of the delivery of the lubricant to the engine takes place in the close fit formed between the outer surface of the piston 50 and the inner surface of the cylinder 70 as the former reciprocates within the latter.

Figure 2A:
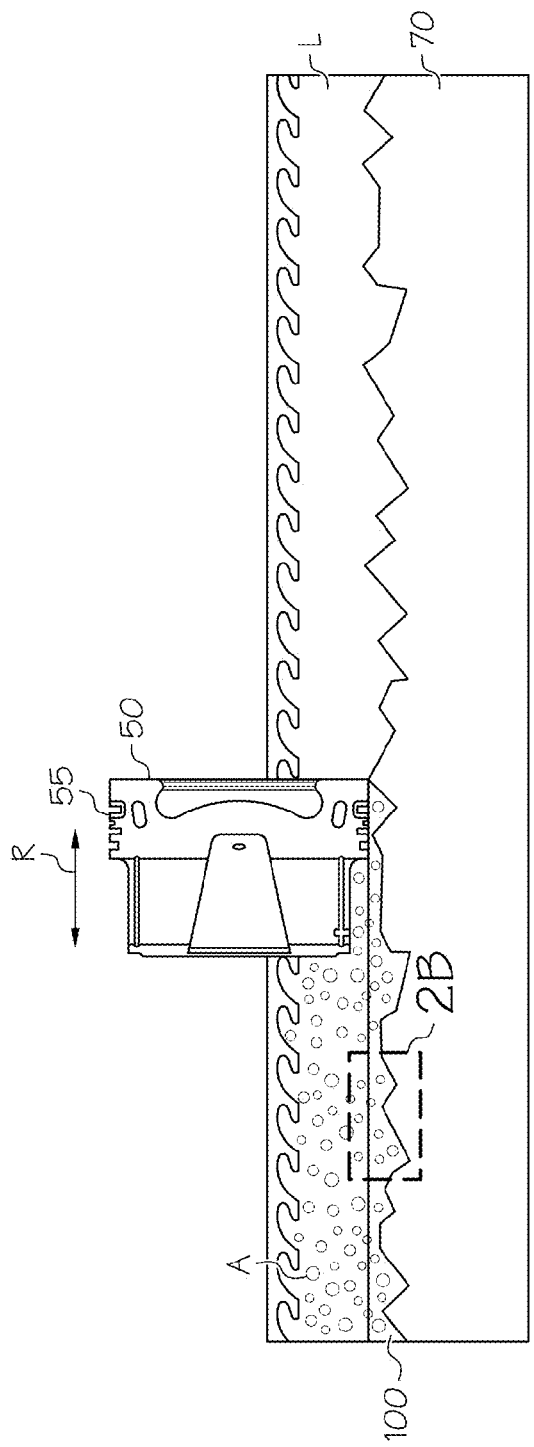
FIG. 2A shows a simplified method for in-situ forming of a low friction coating onto the cylinder of FIG. 1 according to an embodiment of the present invention.
Figure 2B:
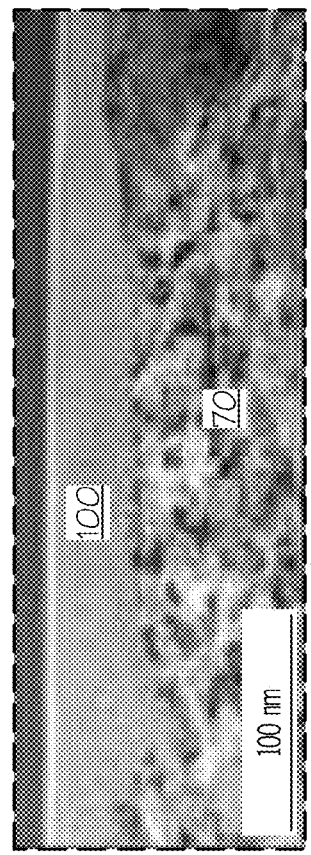
FIG. 2B shows a more detailed view of a portion of the surface of the cylinder of FIG. 2A.

Referring next to FIGS. 2A and 2B, one form of operation used to form a durable tribofilm 100 (also called coating) onto a cylinder wall 70 according to the present invention is shown. In one form, tribofilm 100 contains at least one of $MoS_2$ and $WS_2$ as solid additives A, and in a more particular form, a mixture of both. The thickness of the coating 100 is approximately equal to, or less than, the original surface roughness of the cylinder wall 70. The reciprocating movement of piston 50 (which may also include rings 55) causes the lubricant L that includes (in addition to a motor oil or related liquid) solid lubricant additive A that is between the contacting surfaces of the piston 50 and cylinder wall 70 to be exposed to local stress and temperature conditions that promotes chemical changes in the film that will form in the surface of (at least) the cylinder wall 70. Because cylinder walls 70 are often made from iron-based materials, the surface also contributes to the desirable tribochemical reaction, preferably producing stable iron sulfides (FeS). As such, the coating that is formed has the presence of the solid lubricants from the $MoS_2$ and $WS_2$ additives that fills up the gaps, valleys and related undulations on the surface of the cylinder wall 70.

In the preferred form, the relative movement of the piston 50 and the wall of the cylinder 70 takes place over the initial operation of the engine 10. In the present context, such initial operation may include some or all of the time used to establish traditional "run-in" or "break-in" periods. In an automotive application, the break-in period would typically be complete before the first scheduled oil change that may be scheduled for (by way of example, between 1,000 miles and 3,000 miles. Significantly, the triboforming of the coating 100 through the use of normal engine break-in or related operation demonstrates significant advantages over manufacturing-based approaches, where costly additional steps related to machining steps such as boring, honing, fine honing and film deposition (many or all of which necessitate the use of complex tooling) are avoided.

It is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A method of in-situ forming a low friction coating on a cylinder wall of an internal combustion engine, said method comprising:
    providing a lubricant to a region within said engine defined by said cylinder wall;
    introducing a solid lubricant additive comprising at least one of molybdenum disulfide and tungsten disulfide to said region; and
    traversing a piston along a reciprocating path defined by said cylinder wall such that movement of said piston is substantially limited along a reciprocating direction within a region defined by said cylinder wall such that a tribochemical interaction between a portion of said solid lubricant additive that is carried by said lubricant and situated between said cylinder wall and said piston forms a protective layer on said cylinder wall.

2. The method of claim 1, wherein said lubricant comprises a motor oil.

3. The method of claim 1, wherein said traversing a piston along a path defined by said cylinder wall is produced by operating said engine.

4. The method of claim 1, wherein said solid lubricant additive is placed in contact with said lubricant prior to said providing said lubricant to said region.

5. The method of claim 1, further comprising tribochemically interacting said solid lubricant additive with a surface of said piston to form a protective layer thereon.

6. An engine produced by the method of claim 1.

7. A method of operating an internal combustion engine, said method comprising:
    moving at least one piston and at least one cylinder wall in said engine such that movement of said piston is substantially limited along a reciprocating direction within a region defined by said cylinder wall;
    providing a lubricant to said region; and
    introducing a solid lubricant additive comprising at least one of molybdenum disulfide and tungsten disulfide to said region such that upon subsequent reciprocation of said piston within said cylinder wall, a tribochemical interaction between a portion of said solid lubricant additive that is carried by said lubricant and situated between said cylinder wall and said piston forms a protective layer on said cylinder wall.

8. The method of claim 7, wherein said solid lubricant additive is placed in contact with said lubricant prior to said providing said lubricant to said region.

9. The method of claim 7, wherein said lubricant and said solid lubricant additive are provided to said region prior to said moving of said piston.

10. The method of claim 7, wherein said solid lubricant additive comprises molybdenum disulfide.

11. The method of claim 7, wherein said solid lubricant additive comprises tungsten disulfide.

12. The method of claim 7, wherein said solid lubricant additive comprises a mixture of tungsten disulfide and molybdenum disulfide.

13. A method of tribochemically forming a low friction surface on an internal combustion engine, said method comprising:
    introducing a liquid lubricant and a solid lubricant additive to a surface of at least one of a first component of said engine and a second component of said engine, wherein said solid lubricant additive comprises at least one of tungsten disulfide and molybdenum disulfide; and
    operating said engine through an internal combustion process to have said first component move relative to said second component in a reciprocating manner such that movement of said first component is substantially limited to along a reciprocating direction such that a tribochemical interaction takes place between them to form said low friction surface.

14. The method of claim 13, wherein said first component comprises a cylinder wall and said second component comprises at least one of a piston and a piston ring.

15. The method of claim 13, wherein said liquid lubricant is a motor oil.

* * * * *